US006982810B2

(12) United States Patent

Clough et al.

(10) Patent No.: US 6,982,810 B2

(45) Date of Patent: Jan. 3, 2006

(54) DETECTING THEFT OF PRINT SUBSTANCE FROM A PRINTING DEVICE

(75) Inventors: James Clough, Meridian, ID (US); Darrel Cherry, Meridian, ID (US); Craig R. White, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 874 days.

(21) Appl. No.: 09/952,066

(22) Filed: Sep. 14, 2001

(65) Prior Publication Data

US 2003/0053108 A1 Mar. 20, 2003

(51) Int. Cl.
*G06F 15/00* (2006.01)

(52) U.S. Cl. .......................... 358/1.3; 358/1.1; 358/3.2

(58) Field of Classification Search ................. 358/1.3, 358/1.1, 3–3.29; 347/7, 19, 23; 399/27, 399/29, 79

See application file for complete search history.

(56) References Cited

U.S. PATENT DOCUMENTS

| | | | | |
|---|---|---|---|---|
| 6,456,802 | B1 * | 9/2002 | Phillips | 399/27 |
| 6,459,863 | B2 * | 10/2002 | Kawabe | 399/79 |
| 6,672,695 | B1 * | 1/2004 | Naka et al. | 347/7 |

* cited by examiner

*Primary Examiner*—Twyler Lamb

(57) ABSTRACT

An amount of print substance in a printing device as well as an amount of print substance that should be in the printing device are identified. A difference between these amounts is determined and the difference compared to a threshold value. A determination that print substance has been removed from the printing device is made if the difference exceeds the threshold amount.

20 Claims, 4 Drawing Sheets

DETECTING THEFT OF PRINT SUBSTANCE FROM A PRINTING DEVICE

TECHNICAL FIELD

This invention relates generally to printing devices, and more particularly to detecting theft of print substance from a printing device.

BACKGROUND

As computer technology has advanced the number of computers being used, as well as the tasks these computers are being used to perform, has increased. One significant area of advancement has been with portable computers, resulting in increasingly powerful computers being manufactured in small, easily mobile packages. Such mobility, in turn, has led to an increase in the desire for the availability of peripheral devices, such as printers, to computer users in non-traditional locations (that is, in locations other than at work or home). An example of such a non-traditional location is a hotel room—placement of a printer in a user's hotel room makes the printer readily available to the user when staying in that hotel room.

Unfortunately, in order for businesses to be willing to place peripheral devices in public places such as hotel rooms, these businesses need to be able to guard against theft of not only the devices themselves but also components of the devices. For example, printers typically include print substance stored in one or more cartridges (e.g., ink cartridges or toner cartridges) or refillable reservoirs. Because the print substance is used up during the normal process of printing, it is common for the printers to be designed so that the cartridges are easily replaceable or reservoirs easily refillable. However, by making such replacement or refilling easy, the print substance is also subject to easy theft. For example, an unscrupulous user could bring his or her own depleted ink cartridge to a hotel room and swap it for a near-full cartridge in the printer of that room.

One solution to guard against such theft is constant surveillance of the device (e.g., by video camera). However, such surveillance is costly and in many situations would be viewed by users as an unreasonable intrusion of their privacy. Another solution is to physically restrict access to the replaceable cartridges (e.g., by using a lock to which only appropriate staff have a key). However, this too has problems as it makes replacement of cartridges (or refilling of reservoirs) more cumbersome and also increases the cost of the printer by requiring either additional mechanisms to be manufactured for the locking mechanism or a different printer housing (which means that the standard commercial printers being manufactured cannot be used for public places, and that different printers need to be manufactured for use in public places).

Thus, it would be beneficial to provide a way to detect theft of print substance that did not have these problems.

SUMMARY

Detecting theft of print substance from a printing device is described herein.

According to one aspect, an amount of print substance in a printing device as well as an amount of print substance that should be in the printing device are identified. A difference between these amounts is determined and the difference compared to a threshold value. A determination that print substance has been removed from the printing device is made if the difference exceeds the threshold amount.

DETAILED DESCRIPTION

Detection of print substance theft is described herein. The print substance refers to the substance that is applied to paper or other print media during the printing process, such as ink or toner. Print substance levels in a printing device are monitored and levels that are inconsistent with the usage of the printing device are detected. Such inconsistencies allow for detection of theft of print substance from the printing device, such as a user's swapping of a depleted print cartridge for a full or near-full print cartridge from the printing device.

Figure 1:
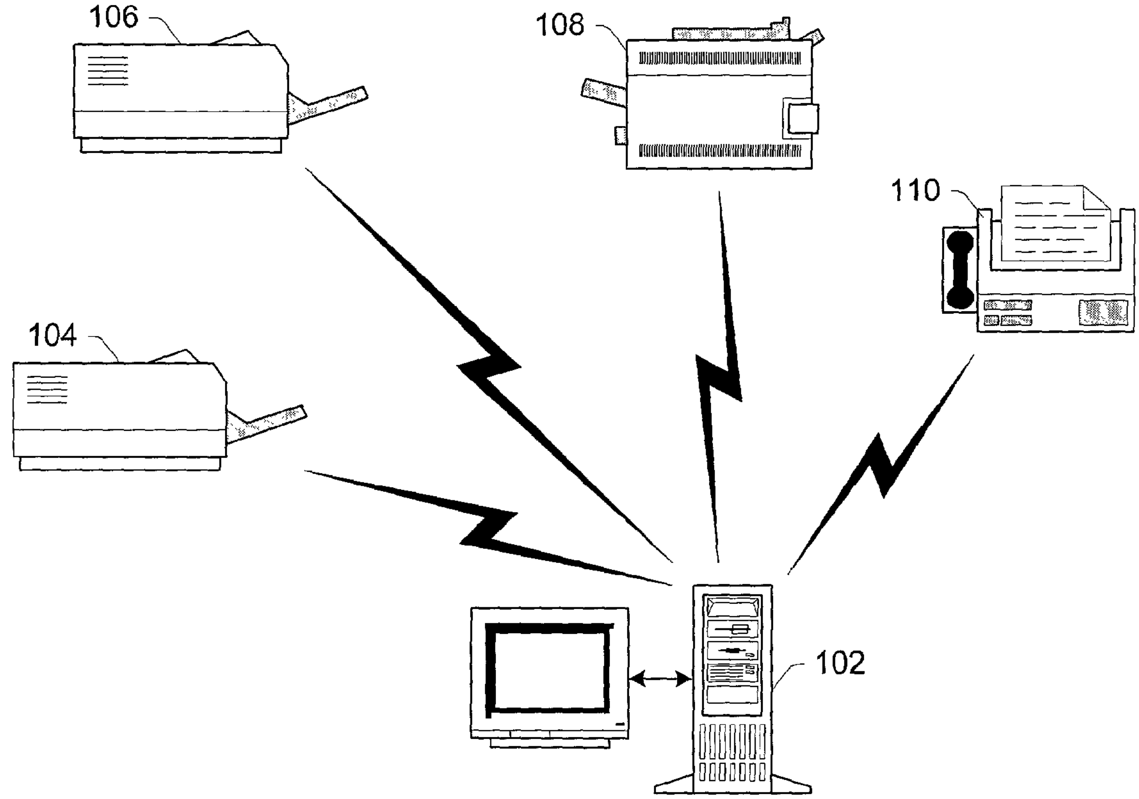
FIG. 1 illustrates an exemplary printing environment in which print substance theft detection can be used.

FIG. 1 illustrates an exemplary printing environment in which print substance theft detection can be used. Environment 100 includes a monitoring system 102 and numerous printing devices 104, 106, 108, and 110. Monitoring system 102 monitors print substance usage in each of the printing devices 104–110 and detects when print substance levels in the devices are inconsistent with usage of the devices. Printing devices 104–110 represent any one or more of a wide variety of conventional printing devices. Examples of such printing devices include printers, facsimile machines, multifunction machines (e.g., including scan, print, and facsimile functionality), etc.

Printing devices 104–110 can print in different ways and using different types of print substance. For example, the print substance may be ink or toner, and may be black and/or one or more other colors (e.g., secondary colors cyan, magenta, and yellow). The print substance can be stored within printing devices 104–110 in a variety of different manners, such as the use of ink cartridges, toner cartridges, and so forth. The print substance theft detection described herein monitors print substance levels, and thus can detect theft of an ink or toner cartridge or, alternatively, theft of print substance from within a cartridge or other substance reservoir.

Each of the printing devices 104–110 is coupled to monitoring system 102, allowing information to be communicated between monitoring system 102 and each of the printing devices 104–110. Any of a wide variety of conventional couplings may be used, including wired (e.g., twisted pair, coax, etc.) and/or wireless (e.g., RF, infrared, etc.) networks using any of a wide variety of public and/or proprietary communications protocols. Alternatively, rather than having a centralized monitoring system 102, print substance usage may be monitored by the individual devices 104–110 and inconsistencies in print substance usage detected by the individual devices 104–110.

Environment 100 represents any of a wide variety of environments in which print substance theft detection may be used. One such exemplary environment is a hotel in which each guest room is equipped with a printer. These printers are monitored from a location remote from the rooms, such as a secure office in the hotel or alternatively off-site (e.g., coupled to the printers in the hotel via the Internet). Other exemplary environments include "hospitality" areas (such as in airports, train terminals, highway rest areas, shopping malls, etc.), offices, college or university buildings or campuses, and so forth.

During operation, monitoring system 102 takes multiple readings of print substance level from the printing devices 104–110. The differences in print substance levels at the times of these various readings, in combination with information obtained by monitoring system 102 regarding the usage of the printing devices during the times between the readings, are used by monitoring system 102 to detect print substance theft.

Figure 2:
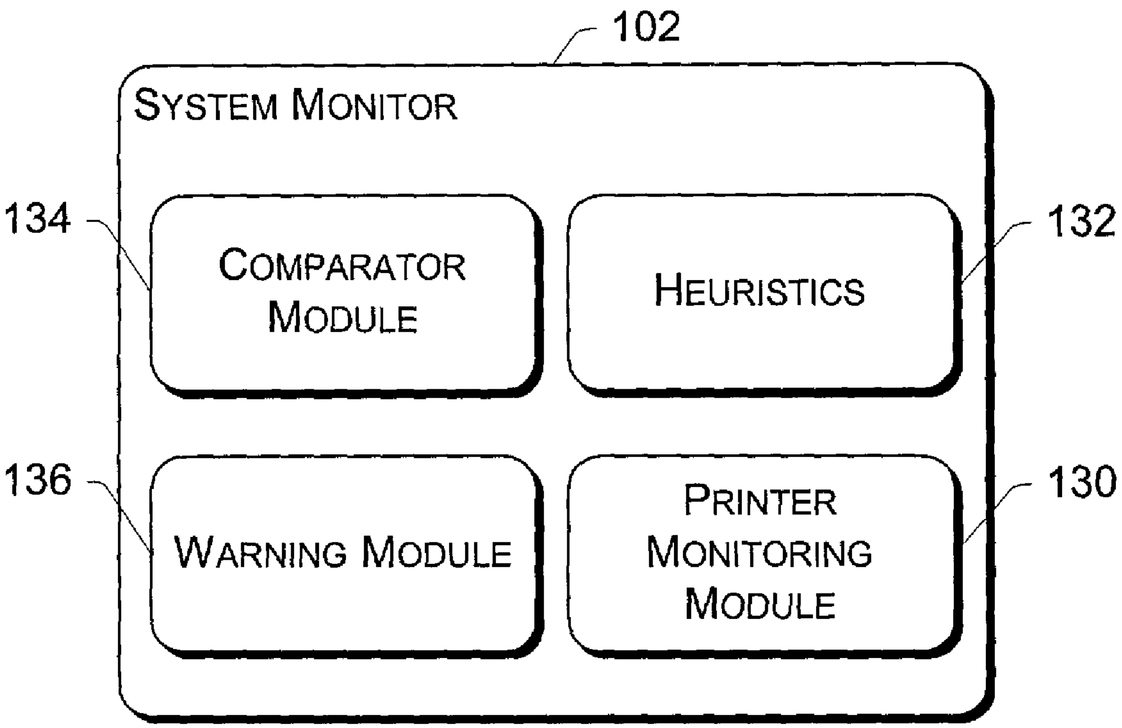
FIG. 2 illustrates an exemplary monitoring system in additional detail.

FIG. 2 illustrates an exemplary monitoring system 102 in additional detail, including a printer monitoring module 130, one or more heuristics 132, a comparator module 134, and a warning module 136. Printer monitoring module 130 communicates with the printing devices being monitored by system 102 to obtain readings of print substance level and printing device usage from the monitored devices. Heuristics 132 relate printing device usage to print substance usage (e.g., if fifty pages or 12,000 dots are printed, heuristics 132 can be used to identify how much print substance should have been used). Comparator module 134 compares the amount of print substance that should have been used by a printing device to an amount actually used, and warning module 136 analyzes the results from comparator module 134 and takes appropriate action based on the results.

During operation, printer monitoring module 130 takes a first reading of print substance level and printing device usage from a printing device being monitored (e.g., one of the printing devices 104–110 of FIG. 1). The values of the first reading (the print substance level and printing device usage) are saved by module 130 and used as a base point to determine theft of the print substance after the time of this first reading. A reading is taken from a printing device by communicating a request for the desired information to the printing device. In one implementation, both system monitor 102 and the printing device support at least one of the current or proposed SNMP (Simple Network Management Protocol) versions, allowing the system monitor to request (and receive) this information from the printing device. When the printing device receives the request for the information from system monitor 102, the printing device operates in a conventional manner to obtain the information and return it to system monitor 102.

The indication of the usage of the printing device can take a variety of different forms, such as a page count (e.g., identifying a number of pages that have been printed on the printing device), a dot count (e.g., identifying a number of drops of ink that have been printed by the printing device), and so forth. Printing devices typically keep track of at least one of these usage indications. These may be from a fixed point in time (e.g., beginning when the printing device was manufactured) or a variable point in time (e.g., can be reset by a user or administrator). In implementations where the printing device keeps track of its usage based on a variable point in time that can be reset remotely, system monitor 102 may reset this point in time to be the time of the first reading of the print substance level rather than obtaining an indication of the printing device usage up to that point in time.

This first reading can be taken at a variety of different times or in response to a variety of different conditions. The timing of this first reading will vary by implementation based on the particular environment as well as administrator or designer desires. For example, in a hotel room the first reading may be taken when a guest checks into the hotel room, while in a college or university environment the first reading may occur at a particular time of day or day of week. By way of another example, the first reading may be taken whenever a print cartridge is replaced by an administrator or other staff person. Printer monitoring module 130 may be notified of this print cartridge replacement by the administrator or staff person, or alternatively automatically detect the replacement (for example, printer monitoring module 130 may be automatically notified by a printing device whenever a print cartridge has been removed (or alternatively an ink reservoir opened), or printer monitoring module 130 may poll, at regular or irregular intervals, the printing devices to determine whether the print cartridge has been removed). The printing device itself may employ a particular mechanism to determine when a print cartridge has been replaced or reservoir opened (e.g., a switch that is triggered when the cartridge is removed or cover to the reservoir opened), or alternatively replacement of a print cartridge or refilling of a reservoir may be automatically detected based on the print substance level changing from a low value to a high value.

After an amount of time has elapsed, printer monitoring module 130 takes a second reading of print substance level and printing device usage from the printing device. Print monitoring module 130 may be programmed or configured to take the second reading at a particular time or in response to a particular event, or alternatively module 130 may take the second reading when instructed to do so by another module or by a user. Analogous to the first reading, the timing of the second reading can vary (and may vary based upon different conditions) by implementation. For example, in a hotel room the second reading may be taken when the guest checks out of the hotel room.

The information obtained from the first and second readings are made available to comparator module 134. Given the usage indications from the first and second readings, comparator module 134 can readily identify the amount that the printing device has been used between the two readings (for example, by subtracting the page count at the time of the first reading from the page count at the time of the second reading). Similarly, given the print substance levels from the first and second readings, comparator module 134 can readily identify the amount of print substance that has been used between the two readings (for example, by subtracting the print substance level at the time of the first reading from the print substance level at the time of the second reading). Thus, comparator module 134 can readily determine the amount of print substance used and the printing device usage between the two readings.

Comparator module 134 accesses heuristics 132 to determine, for the given amount of printing device usage, the amount of print substance that should have been used. Heuristics 132 are a set of one or more models that relate printing device usage to print substance usage. Thus, for a given amount of printing device usage, heuristics 132 can be used to identify how much print substance should have been used. For example, heuristics 132 may indicate for a particular printing device that if 100 pages were printed then 2% of the print substance should have been used.

Each heuristic 132 corresponds to a particular printing device. Situations may also arise where two or more printing devices are similar enough that the same heuristic 132 can correspond to each of the multiple printing devices. Heuristics 132 can be generated in a variety of different manners. In one implementation, a heuristic 132 for a particular printing device is determined by testing the printing device in a controlled environment by printing a variety of different documents and maintaining a record of printing device usage and print substance usage. Print substance usage is typically tested during development of the printing device, so this information it typically readily available. The heuristic for the printing device is readily generated from this information (e.g., the amount of print substance (as a percentage of the total amount of the print substance that the printing device can hold) used for a particular number of pages printed (or dots printed)). In another implementation, a heuristic 132 for a particular printing device is determined by testing the printing device in a somewhat secure environment (e.g., in an office(s) of a company that makes the printers accessible to employees of the company but not accessible to the public as a whole). A record of the printing device usage and print substance usage can then be kept over an extended period of time, and used to create the heuristic 132 for that printing device.

Depending on the type of printing device involved, one or more comparisons may be made. For example, in a black and white printer there is typically only one print substance cartridge or reservoir that needs to be monitored. However, in a color printer there are typically multiple print substance cartridges or reservoirs that need to be monitored (e.g., one for black and another for color, or one for black and multiple cartridges for color (such as one cartridge per secondary color cyan, magenta, and yellow)). In situations where there are multiple print substance cartridges or reservoirs to be monitored, and the printing device tracks printing device usage for the individual cartridges or reservoirs (e.g., dot counts per print cartridge), then heuristics 132 relate the printing device usage to the print substance usage for each cartridge or reservoir. For example, heuristics 132 would identify how much print substance is used for each cartridge or reservoir in a printing device for a particular number of pages printed (or dots printed). Thus, theft of only one of multiple cartridges in a printer can be detected.

Given the amount of print substance that should have been used and the amount of print substance that was used, comparator module 134 can readily generate a difference between the two print substance values. This difference is then communicated to warning module 136. Warning module 136 analyzes the difference between the two print substance values and, based on the results of the analysis, takes appropriate action. In one implementation, warning module 136 compares the difference to a threshold value. If the difference does not exceed the threshold value then warning module 136 determines that no mischief has occurred. However, if the difference exceeds the threshold value then warning module 136 detects that some sort of mischief has occurred (e.g., a print cartridge has been stolen) and operates to warn a user or administrator (e.g., a hotel clerk or manager). The exact value of this threshold will vary, based on the particular device, the accuracy of the printing process, and the accuracy of the print substance level monitoring. For example, the threshold may be 1% for some devices, but 5% for other devices. Warning module 136 may be pre-programmed with the different thresholds for different printing devices, or alternatively obtain the different threshold values from another device (or component of monitor 102).

Warning module 136 may also take into account additional factors in determining whether mischief has occurred, such as whether an ink cartridge has been removed (e.g., which printer monitoring module 130 may automatically detect, as discussed above). This can be factored in to the analysis performed by warning module 136. For example, if the difference in print substance levels is close to the threshold value (e.g., within another threshold amount of the threshold value) and the print cartridge has been removed, then warning module 136 may detect that mischief has occurred even though the threshold level has not been exceeded.

The warning issued by warning module 136 can take any of a variety of forms. For example, an audible or visual alarm may be sounded or displayed at system monitor 102, a visual warning may be presented to a user (e.g., on the hotel clerk's screen as he or she is checking a guest out of the hotel), a log entry may be made for subsequent analysis, and so forth. In addition, other automated actions may be taken by warning module 136, such as automatically charging a customer's credit card or account for the cost of the stolen print substance (e.g., the cost of a new print cartridge), automatically adding the cost of the stolen print substance to the user's bill (e.g., to be displayed on the user's bill for the hotel), and so forth.

Figure 3:
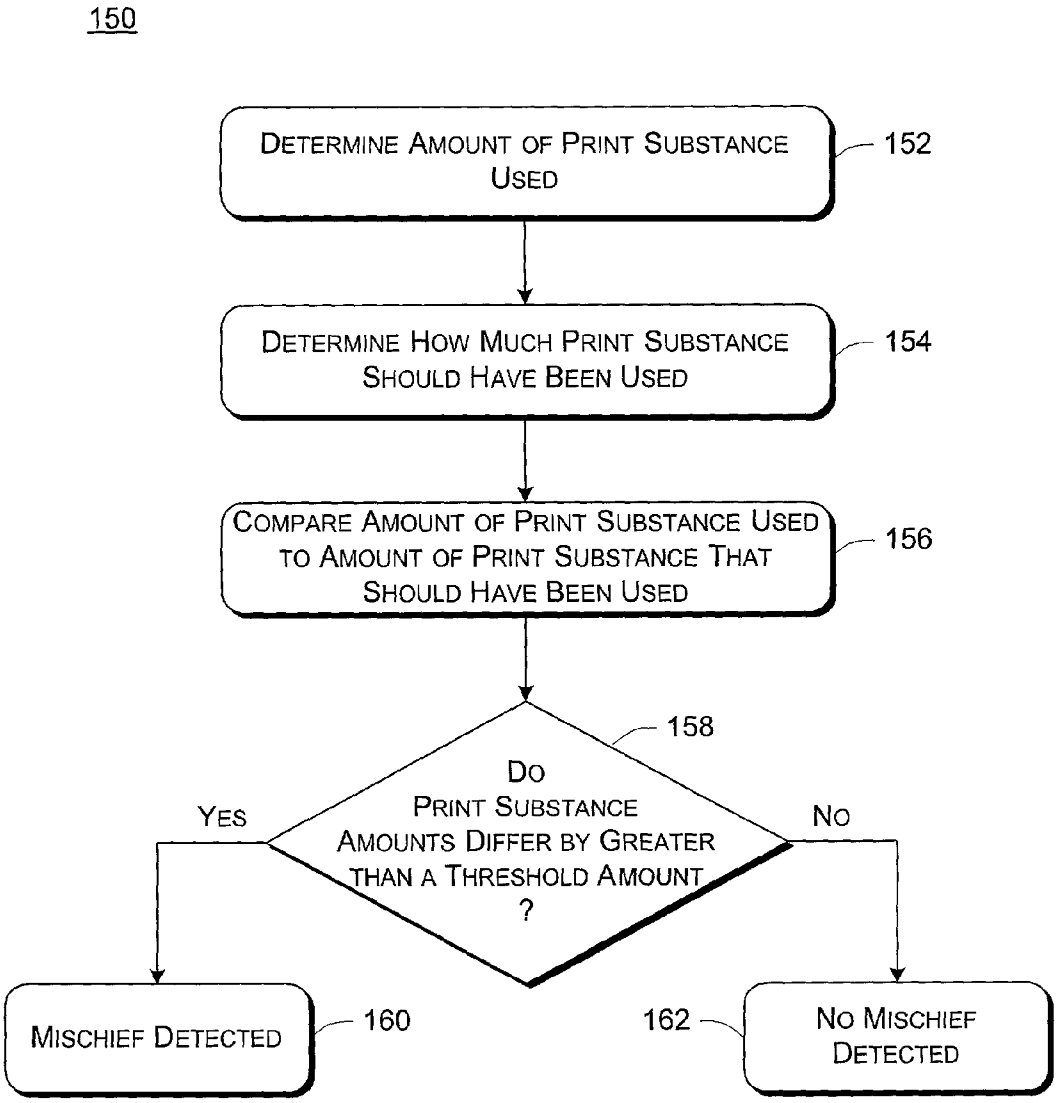
FIG. 3 is a flowchart illustrating an exemplary process for detecting print substance theft.

FIG. 3 is a flowchart illustrating an exemplary process 150 for detecting print substance theft. The process of FIG. 3 is carried out by a monitoring device, such as system monitor 102 of FIGS. 1 and 2, and may be performed in software.

Initially, an amount of print substance used is determined (act 152) as well as an amount of print substance that should have been used (act 154). These two amounts are compared (act 156) and a determination made as to whether the two amounts differ by greater than a threshold amount (act 158). If the two amounts differ by greater than the threshold amount then mischief is detected and appropriate action taken (act 160). However, if the two amounts do not differ by greater than the threshold amount, then no mischief is detected and no additional action need be taken (act 162).

It should be noted that the acts of process 150 can be implemented in an order different than the order illustrated in FIG. 3. For example, act 154 could be performed concurrent with or prior to act 152.

In the discussions herein, reference is made to determining an amount of print substance that should have been used based on the amount of printing device usage. Alternatively, the opposite determination may be made—the amount the printing device should have been used may be determined based on the amount of print substance used. Subsequent analyses would similarly be modified to account for this reversal (e.g., comparing the difference between the amount the printing device was actually used and the amount the printing device should have been used to a threshold value).

Figure 4:
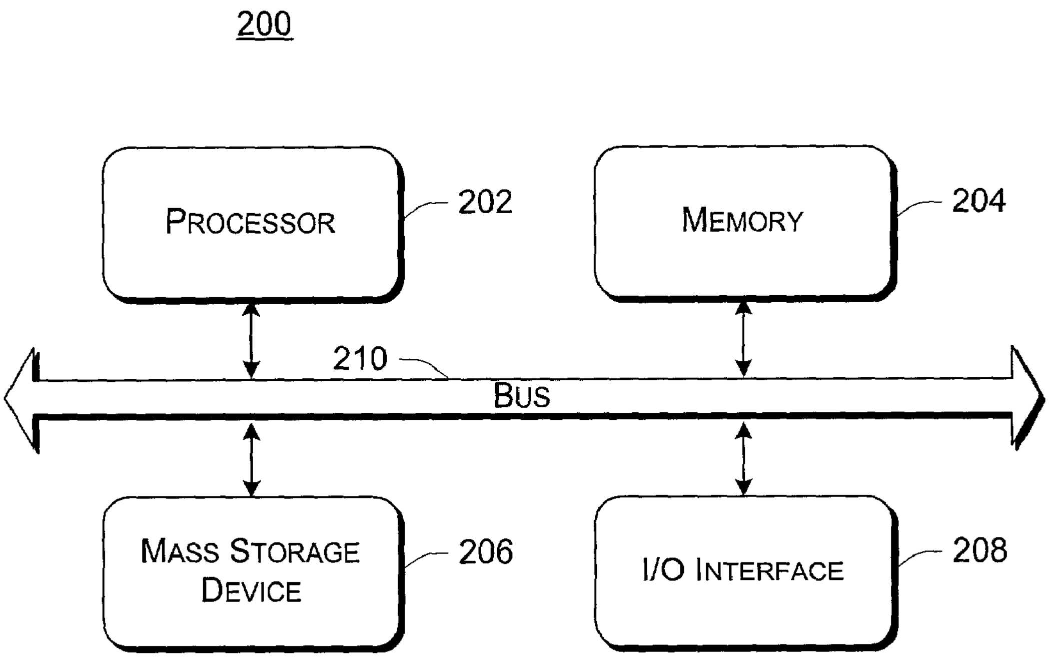
FIG. 4 illustrates an exemplary computer in additional detail.

FIG. 4 illustrates an exemplary computer 200 in additional detail. Computer 200 can be, for example, a system monitor 102 of FIG. 1 or FIG. 2. Computer 200 represents a wide variety of computing devices, such as desktop computers, portable computers, dedicated server computers, multi-processor computing devices, personal digital assistants (PDAs), handheld or pen-based computers, microcontroller-based electronic devices, and so forth.

Computer 200 includes a processor 202, a memory 204, a mass storage device 206, and an input/output (I/O) interface 208, all coupled to a bus 210. Bus 210 represents one or more buses in computer system 200, such as a system bus, processor bus, accelerated graphics port (AGP), peripheral component interconnect (PCI), universal serial bus (USB), and so forth. The bus architecture can vary by computing device as well as by manufacturer. I/O interface 208 is a conventional interface allowing components of computer 200 (e.g., processor 202) to communicate with other computing devices via a network. I/O interface 208 may be, for example, a modem, a network interface card (NIC), and so forth.

Memory 204 represents volatile and/or nonvolatile memory used to store instructions and data for use by processor 202. Typically, instructions are stored on a mass storage device 206 (or nonvolatile memory) and loaded into a volatile memory 204 for execution by processor 202. Additional memory components may also be involved, such as cache memories internal or external to processor 202. Various embodiments of the invention may be implemented, at different times, in any of a variety of computer readable media that is part of, or readable by, computer 200. For example, such computer readable media may be mass storage device 206, memory 204 or a cache memory, a removable disk (not shown) that is accessible by processor 202 or another controller of computer 200 (such as a magnetic disk or optical disk), and so forth.

Computer 200 is exemplary only. It is to be appreciated that additional components (not shown) can be included in computer 200 and some components illustrated in computer 200 need not be included. For example, a display adapter, additional processors or storage devices, additional I/O interfaces, and so forth may be included in computer 200, or mass storage device 206 may not be included.

The discussions herein refer primarily to software components and modules that can be executed by a computing device. It is to be appreciated, however, that the components and processes described herein can be implemented in software, firmware, hardware, or a combination thereof. By way of example, a programmable logic device (PLD) or application specific integrated circuit (ASIC) could be configured or designed to implement various components and/or processes discussed herein.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A method comprising:

identifying an amount of print substance in a printing device;

identifying an amount of print substance that should be in the printing device;

determining a difference between the amount of print substance that is in the printing device and the amount of print substance that should be in the printing device;

comparing the difference to a threshold amount; and determining whether theft of the print substance has occurred based on the comparing.

2. A method as recited in claim 1, wherein determining that print substance has been removed from the printing device comprises determining that an original print cartridge containing print substance has been replaced by another print cartridge if the difference exceeds the threshold amount.

3. A method as recited in claim 1, wherein the print substance comprises ink.

4. A method as recited in claim 1, wherein the print substance comprises toner.

5. A method as recited in claim 1, wherein identifying an amount of print substance in a printing device comprises:

communicating, to the printing device, a request for a current amount of print substance in the printing device; and receiving, in response to the request, the current amount of print substance in the printing device.

6. A method as recited in claim 1, wherein identifying an amount of print substance that should be in the printing device comprises:

obtaining an indication of a number of pages that have been printed on the printing device;

using a heuristic to determine, based on the number of pages, an amount of print substance that should have been used by the printing device in printing the pages; and determining, based on both the amount of print substance that should have been used and a previous amount of print substance in the printing device, the amount of print substance that should be in the printing device.

7. A method as recited in claim 1, wherein identifying an amount of print substance that should be in the printing device comprises:

obtaining an indication of a number of dots that have been printed by the printing device;

using a heuristic to determine, based on the number of dots, an amount of print substance that should have been used by the printing device in printing the pages; and determining, based on both the amount of print substance that should have been used and a previous amount of print substance in the printing device, the amount of print substance that should be in the printing device.

8. A method as recited in claim 1, further comprising determining that print substance has been removed from the printing device if a print cartridge containing the print substance has been removed from the printing device even if the difference does not exceed the threshold amount.

9. A system comprising:

a printer monitoring module configured to communicate with one or more printing devices located remotely from the system in order to obtain an indication of an amount of print substance in a printing device and an indication of an amount the printing device has been used;

a heuristic corresponding to the printing device, wherein the heuristic relates an amount of usage of the printing device to an amount of print substance usage;

a comparator module configured to access the heuristic corresponding to the printing device and determine a difference between the amount of print substance usage, from the heuristic, that corresponds to the amount the printing device has been used and the amount of print substance usage indicated by the printing device; and a warning module configured to determine, based on the difference, whether theft of the print substance has occurred.

10. A system as recited in claim 9, wherein the warning module is further configured to take an appropriate action in the event theft of the print substance is determined to have occurred.

11. A system as recited in claim 9, wherein the system comprises a computing device coupled to the one or more printing devices via a network.

12. One or more computer readable media having stored thereon a plurality of instructions that, when executed by one or more processors, causes the one or more processors to perform acts comprising:

identifying an amount of print substance in a printing device;

determining an amount of print substance that should be in the printing device;

determining a difference between the amount of print substance that is in the printing device and the amount of print substance that should be in the printing device;

comparing the difference to a threshold amount; and determining whether theft of the print substance has occurred based on the comparing.

13. One or more computer readable media as recited in claim 12, wherein determining that print substance has been removed from the printing device comprises determining that that an original print cartridge containing print substance has been replaced by another print cartridge if the difference exceeds the threshold amount.

14. One or more computer readable media as recited in claim 12, wherein the print substance comprises ink.

15. One or more computer readable media as recited in claim 12, wherein the print substance comprises toner.

16. One or more computer readable media as recited in claim 12, wherein identifying an amount of print substance in a printing device comprises:

communicating, to the printing device, a request for a current amount of print substance in the printing device; and receiving, in response to the request, the current amount of print substance in the printing device.

17. One or more computer readable media as recited in claim 12, wherein determining an amount of print substance that should be in the printing device comprises:

obtaining an indication of a number of pages that have been printed on the printing device;

using a heuristic to determine, based on the number of pages, an amount of print substance that should have been used by the printing device in printing the pages; and determining, based on both the amount of print substance that should have been used and a previous amount of print substance in the printing device, the amount of print substance that should be in the printing device.

18. One or more computer readable media as recited in claim 12, wherein determining an amount of print substance that should be in the printing device comprises:

obtaining an indication of a number of dots that have been printed by the printing device;

using a heuristic to determine, based on the number of dots, an amount of print substance that should have been used by the printing device in printing the pages; and determining, based on both the amount of print substance that should have been used and a previous amount of print substance in the printing device, the amount of print substance that should be in the printing device.

19. One or more computer readable media as recited in claim 12, wherein the plurality of instructions further cause the one or more processors to perform an act comprising determining that print substance has been removed from the printing device if a print cartridge containing the print substance has been removed from the printing device even if the difference does not exceed the threshold amount.

20. One or more computer readable media as recited in claim 12, wherein the plurality of instructions further cause the one or more processors to perform an act comprising charging, in response to determining that print substance has been removed from the printing device, a user of the printing device a fee for the removed print substance.

* * * * *